June 15, 1926.  1,588,454
J. S. HARRIS
SUPPORT FOR GAMBRELS AND THE LIKE
Filed June 4, 1924
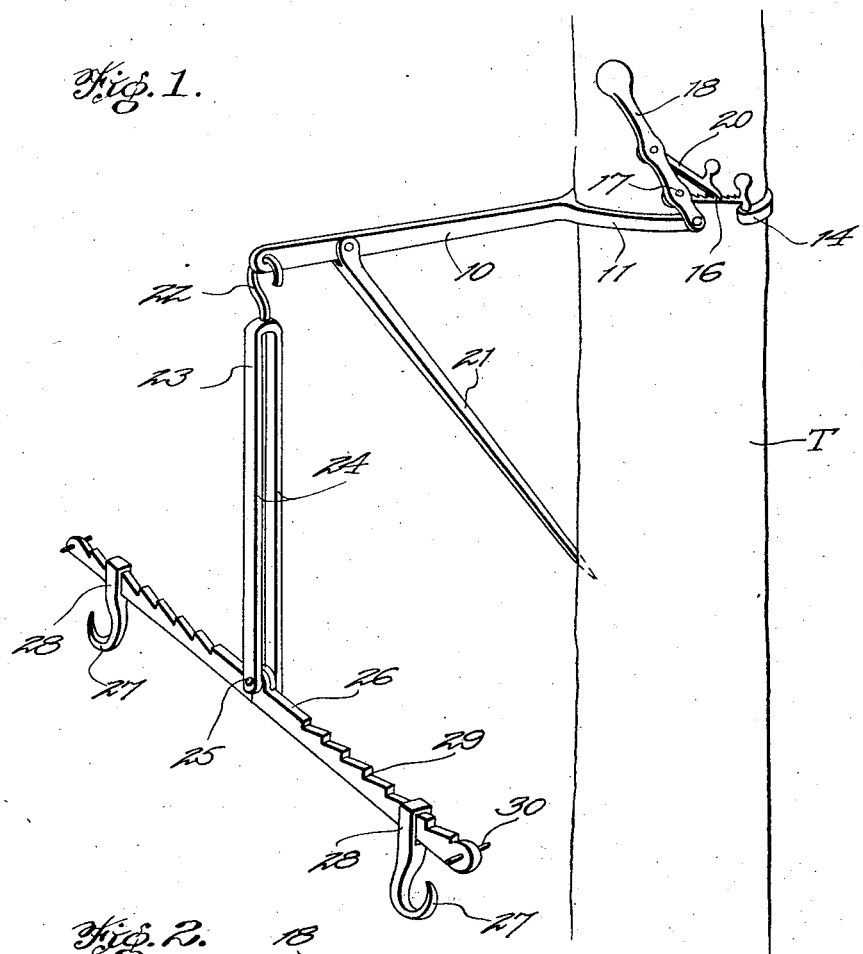
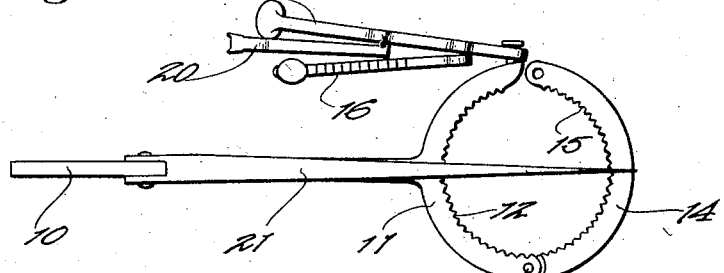
John S. Harris
INVENTOR
BY *Victor J. Evans*
ATTORNEY
WITNESS:

Patented June 15, 1926.

1,588,454

UNITED STATES PATENT OFFICE.

JOHN S. HARRIS, OF HOPEWELL JUNCTION, NEW YORK.

SUPPORT FOR GAMBRELS AND THE LIKE.

Application filed June 4, 1924. Serial No. 717,812.

This invention relates to improvements in gambrels, an object being to provide a gambrel which is especially adapted for the use of trappers, hunters and so forth, in that it is light and durable in construction, may be folded into a compact form for transportation and may be readily attached to a tree, post and the like so that captured game may be conveniently skinned.

With the above and other objects in view, the invention further includes the following novel features and details of construction, to be hereinafter more fully described, illustrated in the accompanying drawings and pointed out in the appended claims.

In the drawings:—

Figure 1 is a perspective view illustrating the invention in position for use.

Figure 2 is a bottom plan view of the hanger bracket showing the latter folded.

Referring to the drawings in detail wherein like characters of reference denote corresponding parts, the reference character 10 indicates a supporting arm which forms a part of a hanger bracket capable of being attached to a tree, post or the like. For this purpose the inner end of the arm 10 has rigidly connected thereto a substantially semi-circular gripping member 11 having a toothed or serrated edge 12. This member has pivotally connected to one end as indicated at 13, one end of a substantially semi-circular gripping member 14, the latter also having a toothed or serrated edge 15, the members 11 and 14 providing a sectional gripping member. The opposite ends of the members 11 and 14 are adjustably connected and for this purpose one of the said members (the member 14) has extending therefrom a toothed bar 16 which is connected to the member 14 in a manner to permit of limited pivotal movement. The opposite end of the toothed bar 16 is pivotally connected as shown at 17 to an adjusting lever 18, the latter being in turn pivotally connected to the member 11 as shown at 19. The adjusting lever 18 has pivotally connected thereto a dog 20 whose free end is adapted to engage the teeth of the bar 16 so that the adjacent ends of the members 11 and 14 may be clamped into position as shown in Figure 1 of the drawings.

The arm 10 has pivotally connected thereto one end of a brace rod 21, whose opposite pointed end is adapted to be engaged with the trunk T of a tree or other support upon which the hanger bracket is clamped.

The hanger bracket is provided at its outer end with an opening for removably receiving a hook 22 which is swiveled in the upper end of a supporting link 23. This link includes spaced parallel arms 24 which have pivotally secured between their lower ends upon a pivot pin 25, the adjacent ends of stretcher bar sections 26, the said pin 25 also serving to pivotally connect these stretcher bar sections. These stretcher bar sections 26 carry hooks 27 which are carried by links 28, while the latter receive the stretcher bar sections 26 and are adapted to engage spaced teeth 29 provided upon said stretcher bar sections. The hooks 27 may thus be relatively adjusted to suit the size of the animal attached to the gambrel. It might be here stated that the gambrel is especially adapted for use with such animals as skunks, raccoons and animals of a like size, although it may be constructed for use of larger animals. The links 28 are retained upon the stretcher bar sections 26 by means of pins 30.

It will be apparent from the foregoing description and accompanying drawings that the invention provides a gambrel which may be compactly folded and easily carried about. In addition it may be readily set up by attaching it to the trunk of a tree or other convenient support.

The invention is susceptible of various changes in its form, proportions and minor details of construction and the right is herein reserved to make such changes as properly fall within the scope of the appended claims.

Having described the invention what is claimed is:—

1. In a supporting device, an arm, a gripping member comprising pivotally connected sections connected to the arm, a lever pivotally secured to one of the ends of the sectional member, an arm having one end pivotally secured to the lever, means at the other end of the arm for engagement with the adjacent end of the sectional member to regulate the relative positions of the ends of the members by adjusting the lever and means for holding the lever in adjusted position.

2. In a supporting device, an arm, a sectional gripping member connected to the arm, a lever pivotally secured to one of the ends of the sectional gripping member, a toothed arm having one end pivotally secured to the lever, means at the other end of the arm for engagement with the adjacent end of the split gripping member to regulate the relative positions of the ends of the members by adjusting the lever, and a dog having one end pivotally secured to the lever and its opposite end engaging the teeth of the arm to hold the adjacent end of the gripping member in adjusted position.

3. In a supporting device, an arm, a rigid transversely disposed substantially semi-circular gripping member at the inner end of the arm, a substantially semi-circular gripping member having one of its ends pivotally secured to one end of the rigid gripping member, a lever pivotally secured to said rigid gripping member, an arm having one end pivotally secured to the lever, means at the opposite end of the pivotally secured arm for removable engagement with the free end of the pivoted gripping member to adjustably connect the gripping members and means carried by the lever and engaging the pivoted arm to hold the latter in position.

In testimony whereof I affix my signature.

JOHN S. HARRIS.